United States Patent
Harrington et al.

(10) Patent No.: US 10,691,543 B2
(45) Date of Patent: Jun. 23, 2020

(54) MACHINE LEARNING TO ENHANCE REDUNDANT ARRAY OF INDEPENDENT DISKS REBUILDS

(71) Applicant: International Business Machines Corporation, Armonk, NY (US)

(72) Inventors: Shaun E. Harrington, Sahuarita, AZ (US); Emmanuel Barajas Gonzalez, Guadalajara (MX); Franklin D. Watkins, Jr., Holly Springs, NC (US); Gary Anna, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/811,822

(22) Filed: Nov. 14, 2017

(65) Prior Publication Data
US 2019/0146875 A1 May 16, 2019

(51) Int. Cl.
*G06F 11/00* (2006.01)
*G06F 11/10* (2006.01)
*G06N 20/00* (2019.01)

(52) U.S. Cl.
CPC ......... *G06F 11/1092* (2013.01); *G06N 20/00* (2019.01)

(58) Field of Classification Search
CPC ............ G06F 11/1092; G06F 11/0727; G06F 11/1076; G06N 20/00
See application file for complete search history.

(56) References Cited

U.S. PATENT DOCUMENTS

| | | | |
|---|---|---|---|
| 9,823,980 B2* | 11/2017 | Schirripa | G06F 11/1092 |
| 2006/0218433 A1* | 9/2006 | Williams | G06F 11/1092 714/6.32 |
| 2008/0091741 A1* | 4/2008 | Zohar | G06F 11/1092 |
| 2009/0271659 A1 | 10/2009 | Troppens et al. | |
| 2010/0031082 A1* | 2/2010 | Olster | G06F 11/1092 714/6.32 |
| 2010/0107003 A1 | 4/2010 | Kawaguchi | |
| 2012/0079317 A1 | 3/2012 | Nelogal | |
| 2013/0205166 A1 | 8/2013 | Nair et al. | |
| 2014/0006369 A1* | 1/2014 | Blanchflower | G06F 16/90344 707/706 |
| 2014/0215147 A1 | 7/2014 | Pan | |
| 2014/0281689 A1 | 9/2014 | Fischer | |

(Continued)

FOREIGN PATENT DOCUMENTS

| | | |
|---|---|---|
| CN | 103823728 A | 5/2014 |
| EP | 0521630 A2 | 1/1993 |

(Continued)

OTHER PUBLICATIONS

Babu et al., "DIADS: Addressing the "My-Problem-or-Yours" Syndrome with Integrated SAN and Database Diagnosis", FAST '09 Proceedings of the 7th conference on File and storage technologies, pp. 57-70, San Francisco, CA, Feb. 24-27, 2009.

*Primary Examiner* — Joseph D Manoskey
(74) *Attorney, Agent, or Firm* — Andrew Aubert

(57) ABSTRACT

Machine logic (for example, software) for storing: (i) a plurality of files across multiple disk drives of a RAID array and (ii) checksum data for the files. The machine logic rules assign priority values to each file based on one or more attributes of the files. These priority values are used to determine the order in which files are rebuilt using the checksum data so that the most important files are rebuilt first.

17 Claims, 6 Drawing Sheets

(56) References Cited

U.S. PATENT DOCUMENTS

2014/0365819 A1* 12/2014 Cooper ............... G06F 11/1092
714/6.22
2017/0242627 A1* 8/2017 Mills ................... G06F 11/1076

FOREIGN PATENT DOCUMENTS

| EP | 2626780 A1 | 8/2013 |
| WO | WO-2014089311 A2 | 6/2014 |
| WO | 2019097360 A1 | 5/2019 |

* cited by examiner

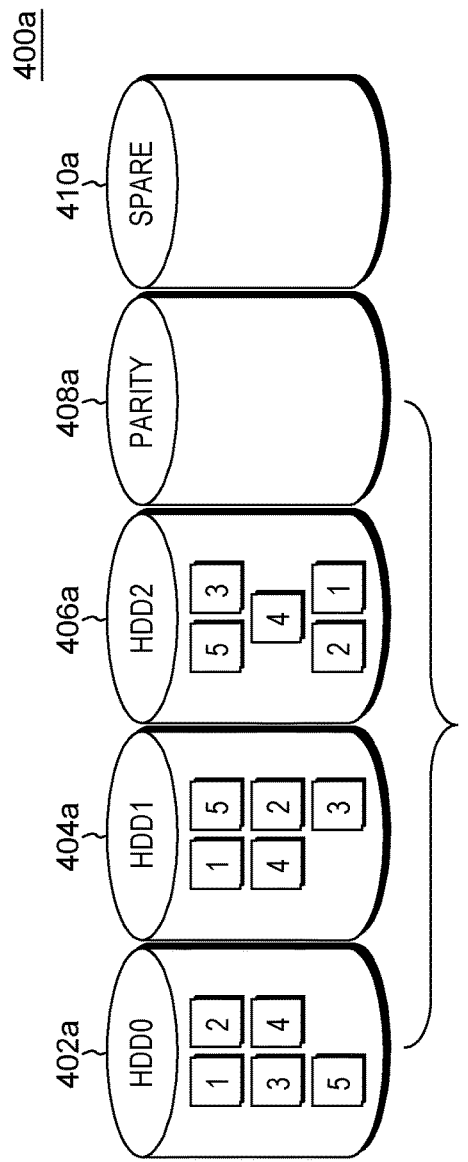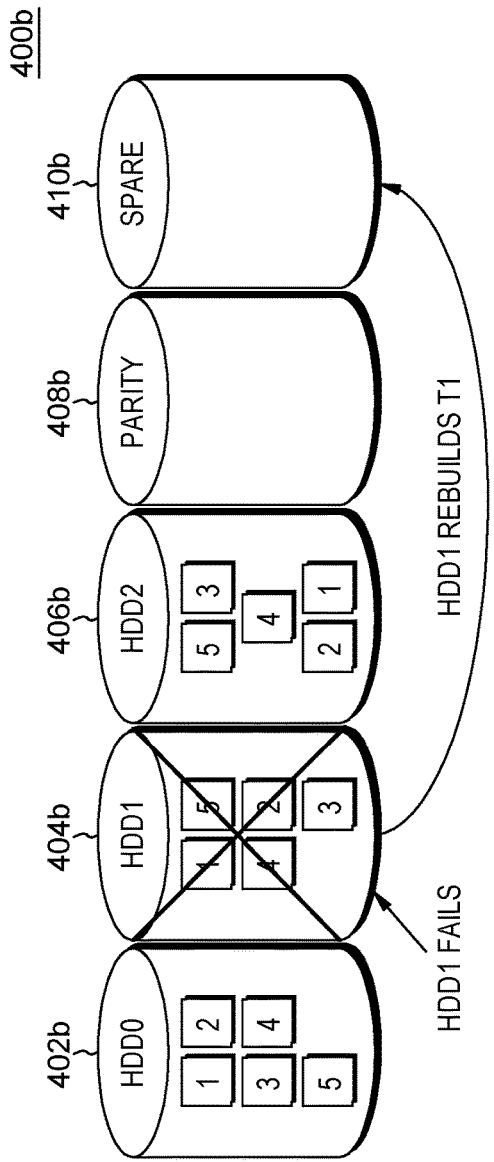
FIG. 4A
FIG. 4B

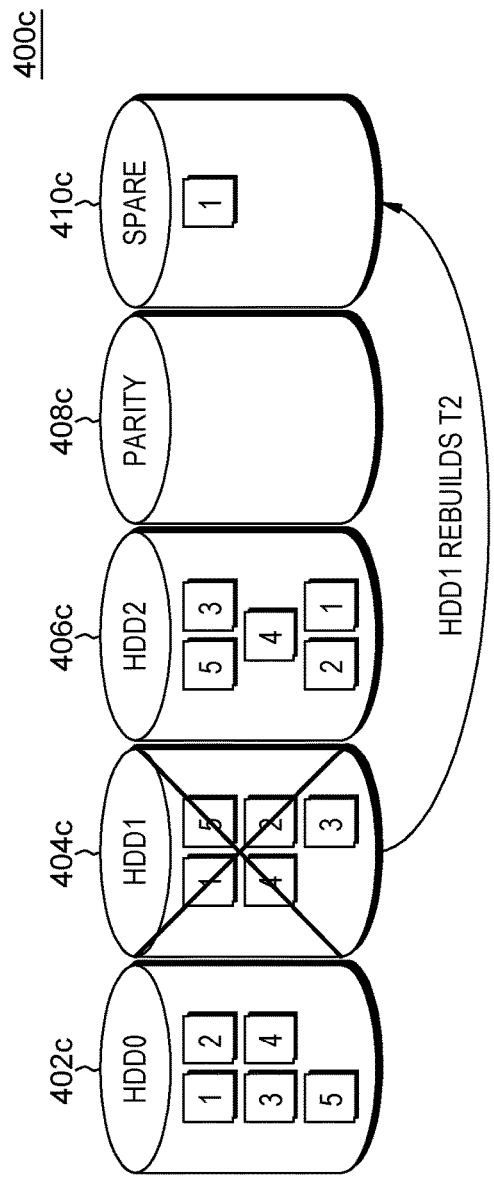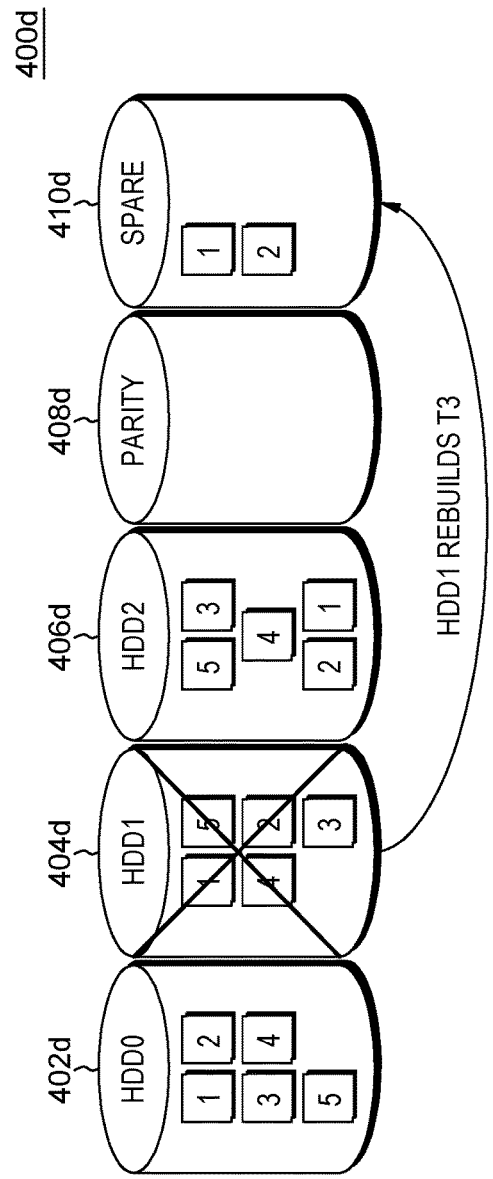
FIG. 4C
FIG. 4D

MACHINE LEARNING TO ENHANCE REDUNDANT ARRAY OF INDEPENDENT DISKS REBUILDS

BACKGROUND

The present invention relates generally to redundant array of independent disk data storage (RAID) and more particularly to processes for rebuilding RAID implementations.

Storage redundant array of independent disks (RAID array) technology is used to store computer data, typically in large quantities. For data redundancy, the common methodology is to stripe data across drives and then copy back the full drive in the event of a failure. If, in the event of a failure, the copy completes, then the data redundancy is successful. In a RAID array, a parity drive is a hard drive (or other storage device that functions in the manner of a hard drive) to provide fault tolerance. For example, RAID 3 uses a parity drive to create a system that is both fault tolerant and fast (due to the data striping of RAID 3). A single data bit is added to the end of a data block to ensure the number of bits in the message is either odd or even. One way to implement a parity drive in a RAID array is to store one of various forms of parity data.

Parity data is data derived from a large set of source data that is significantly smaller than the large set of source data. Parity data is derived in various known ways (such as using the XOR function across selected pairs of bits of source data) such that if a portion of the source data is lost (for example, one drive in a RAID array malfunctions), then the lost data can be derived using: (i) the parity data on the parity drive; and (ii) the remaining, intact source data (in this example, the source data on the drives of the RAID array that did not malfunction).

SUMMARY

According to an aspect of the present invention, there is a method, computer program product and/or system that performs the following operations (not necessarily in the following order): (i) storing a plurality of blocks of data in a striped redundant array of independent devices (RAID) storage system that includes a plurality of storage devices; (ii) storing parity data for the plurality of blocks of data; (iii) for each given block of data of the plurality of blocks of data, assigning a priority data value to the given block of data; and (iv) responsive to a failure of a first storage device of the plurality of storage devices, rebuilding, using the parity data and data of the blocks of data stored on the plurality of storage devices other than the first storage device, blocks of data that were stored on the first storage device in an order determined by priority values of the blocks of data that were stored on the first storage device.

BRIEF DESCRIPTION OF THE DRAWINGS

FIGS. 4A through 4E are block diagrams showing a rebuild of a failed disk drive in a RAID system according to an embodiment of the present invention.

DETAILED DESCRIPTION

Figure 1:
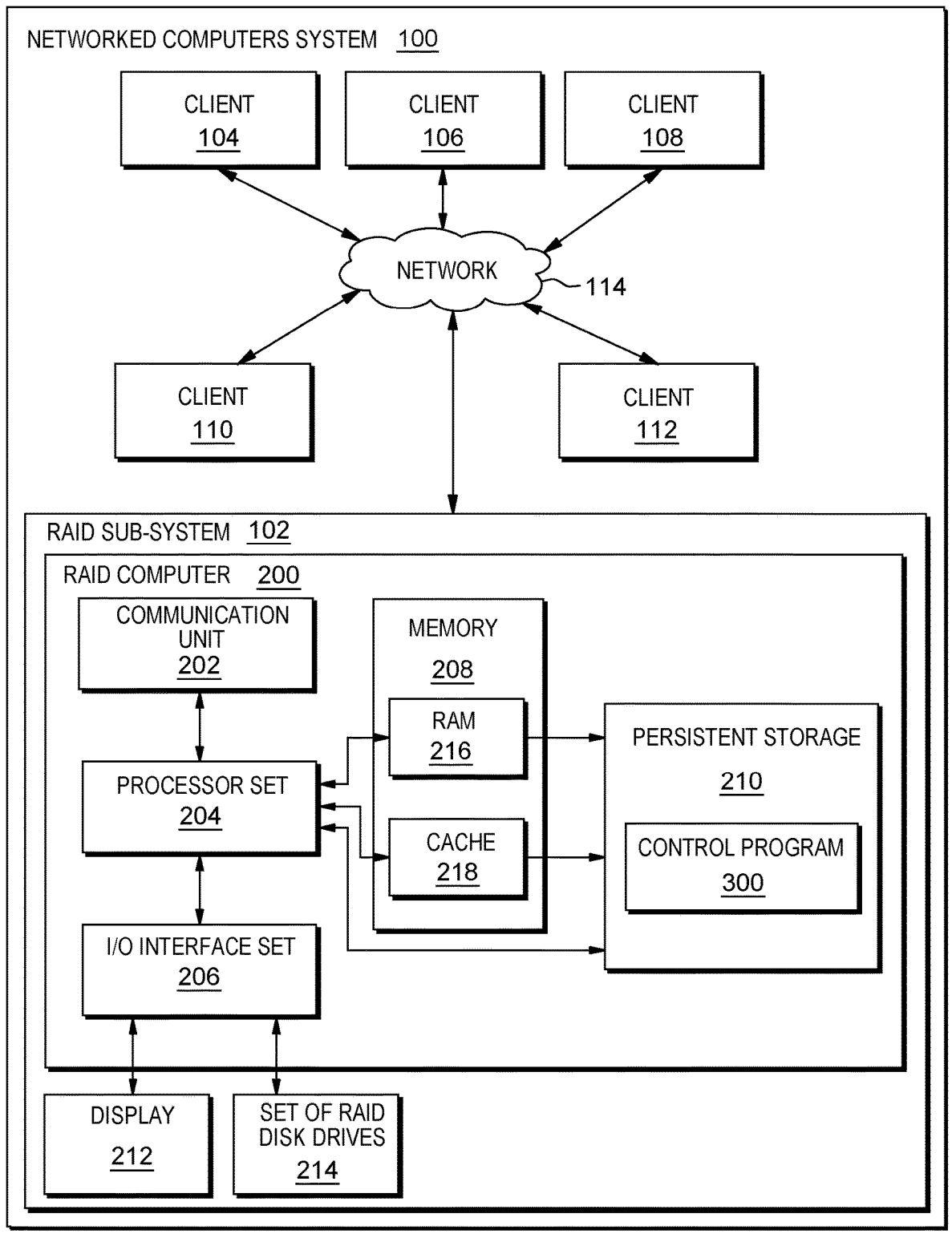
FIG. 1 is a block diagram view of a first embodiment of a system according to the present invention.

Some embodiments of the present invention are directed to machine logic (for example, software) for storing: (i) a plurality of files across multiple disk drives of a RAID array and (ii) checksum data for the files. In some embodiments, priority values are then assigned to each file based on one or more attributes of the files. In some embodiments, these priority values are used to determine the order in which files are rebuilt using the checksum data so that the most important files are rebuilt first. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: RAID sub-system 102; Client sub-systems 104, 106, 108, 110, 112; communication network 114; RAID computer 200; communication unit 202; processor set 204; input/output (I/O) interface set 206; memory device 208; persistent storage device 210; display device 212; set of raid disk drives 214; random access memory (RAM) devices 216; cache memory device 218; and control program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Control program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Control program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
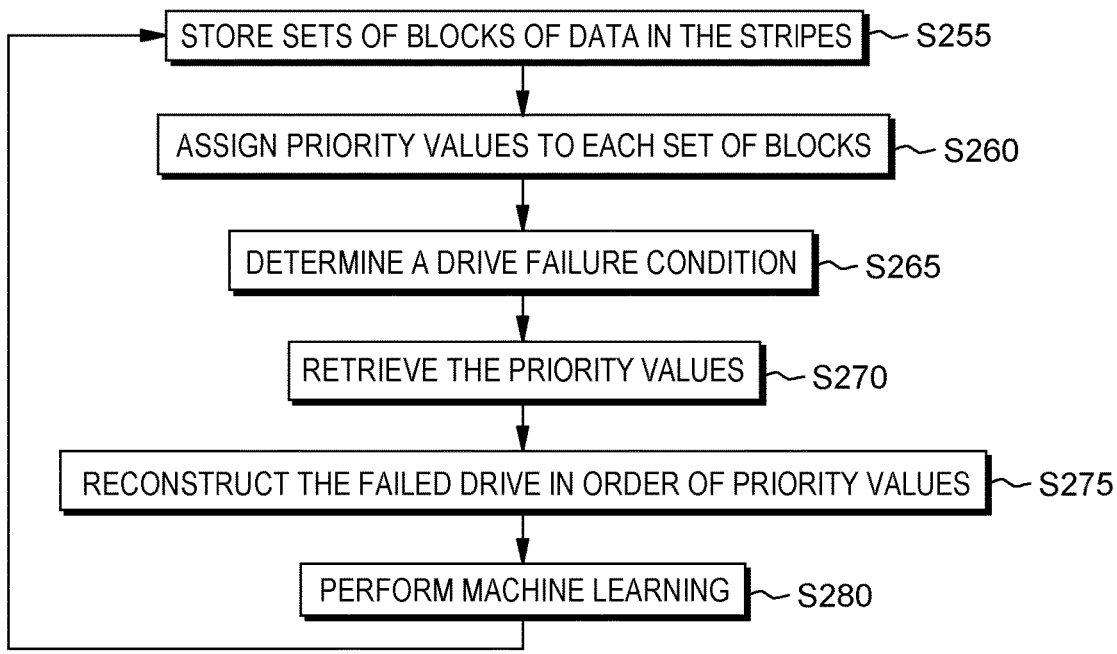
FIG. 2 is a flowchart showing a first embodiment method performed, at least in part, by the first embodiment system.

FIG. 2 shows flowchart 250 depicting a method according to the present invention.

Figure 3A:
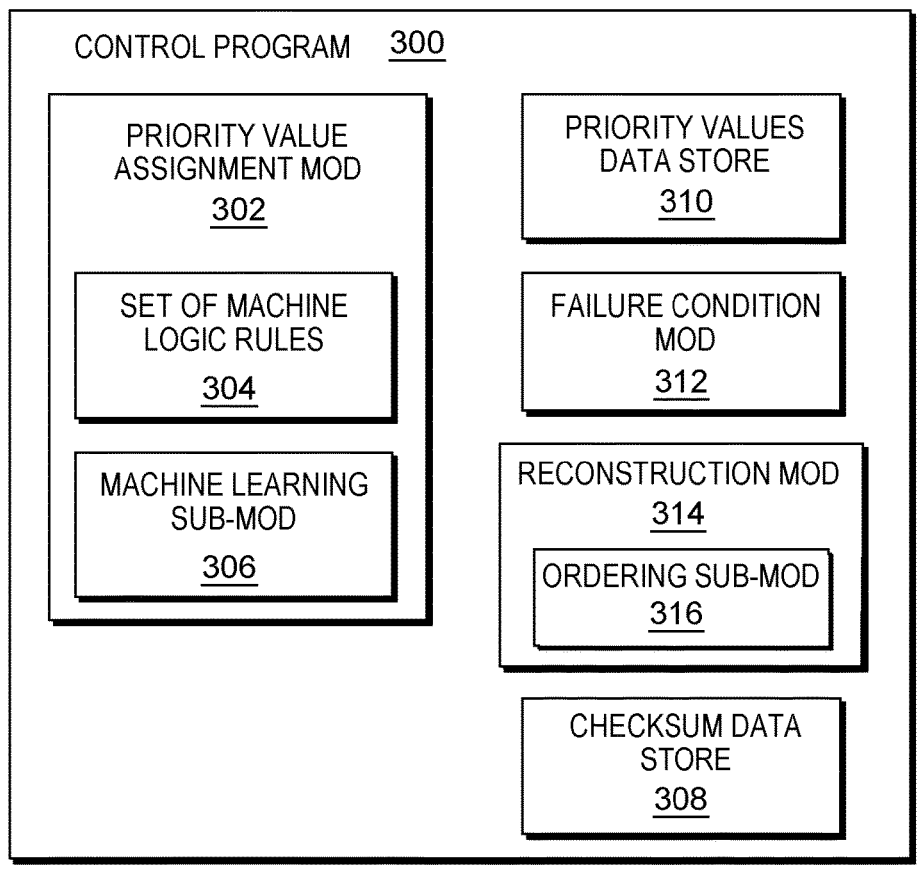
FIG. 3A is a block diagram showing a machine logic (for example, software) portion of the first embodiment system.

FIG. 3A shows program 300 for performing at least some of the method operations of flowchart 250. This method and associated software will now be discussed, over the course of the following paragraphs, with extensive reference to FIG. 2 (for the method operation blocks), FIG. 3A (for the software blocks) and FIG. 3B (for the data blocks).

Figure 3B:
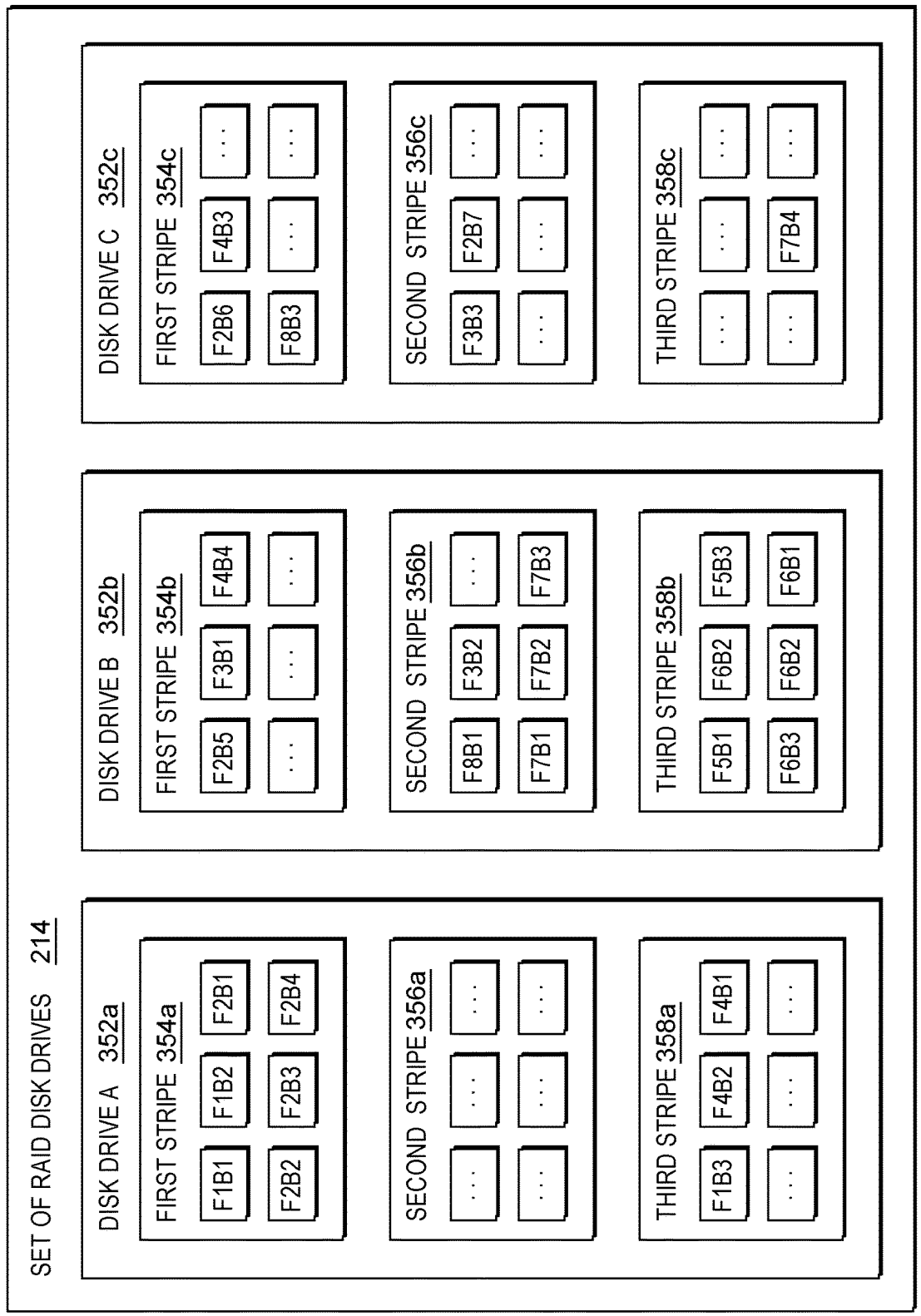
FIG. 3B is a block diagram showing data block assignments to memory space on three disk drives of a raid array of the first embodiment system.
Figure 4E:
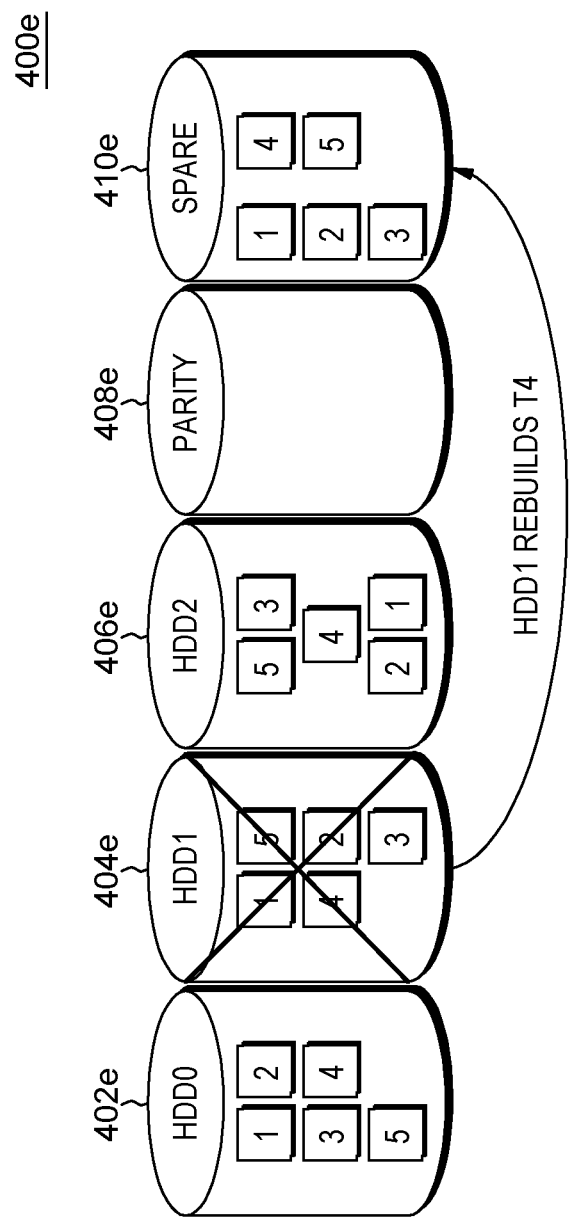

Processing begins at operation S255, where control program 300 stores sets of blocks of data in stripes across a set of raid disk drives 214 (see FIG. 1). In this embodiment, there are three data stripes across three disk drives comprising a set of raid disk drives (see FIG. 3B). Each data stripe of each disk drive includes six addresses of blocks for storing data, where each address can contain one block of data for a file. That is, a block of data will only contain data associated with a single file—but a single file will usually have more than one block of data. For example, in FIG. 3B, a first file (F1) includes three blocks of data as follows: (i) F1B1; (ii) F1B2; and (iii) F1B3. FIG. 3B includes: (i) set of RAID disk drives 214; (ii) disk drive A 352(a); (iii) first stripe 354a with: (a) F1B1, (b) F1B2, (c) F2B1, (d) F2B2, (e) F2B3, and (f) F2B4; (iv) second stripe 356a with no file blocks; (v) third stripe 358a with: (a) F1B3, (b) F4B2, and (c) F4B1; (vi) disk drive B 352b; (vii) first stripe 354b with: (a) F2B5, (b) F3B1, and (c) F4B4; (viii) second stripe 356b with: (a) F8B1, (b) F3B2, (c) F7B1, (d) F7B2, and (e) F7B3; (ix) third stripe 358b with: (a) F5B1, (b) F6B2, (c) F5B3, (d) F6B3, (e) F6B2, and (f) F6B1; (x) disk drive C 352c; (xi) first stripe 354c with: (a) F2B6, (b) F4B3, and (c) F8B3; (xii) second stripe 356c with: (a) F3B3, and (b) F2B7; and (xiii) third stripe 358c with F7B4.

In this embodiment, a block contains one byte of memory, where one byte is defined as eight bits. Each file comprises a plurality of blocks that may be written across the blocks of the three stripes of the three disk drives. For example, in this embodiment, shown in FIG. 3B, File 2 has: (i) four blocks written to the First Stripe 354a of disk drive A 352a (F2B1, F2B2, F2B3, F2B4); (ii) one block written to First Stripe 354b of disk drive B 352b (F2B5); (iii) one block written to First Stripe 354c of disk drive C 352c (F2B6); and (iv) one block written to Second Stripe 356c of the disk drive C (F2B7). Alternatively, a set of raid disk drives may include as few as two disk drives with no limit on the maximum number of disk drives included in a raid array. As a further alternative, the number of stripes in a disk drive of a set of raid disk drives can be as few as one with the maximum number of stripes determined by stripe byte allocation and storage capacity of the disk drives. For example, where disk drives A, B, and C all have a 1 megabyte (one million bytes)

storage capacity and each stripe is allocated 1 kilobyte (one thousand bytes) of storage, each disk drive may accommodate a maximum of one thousand stripes. For illustrative purposes, the disk drives shown in FIG. 3B each have a storage capacity of 18 bytes and a stripe allocation of 6 bytes, but other storage capacities and stripe allocations are possible. As a further alternative, a block may be defined to include more than one byte, or may use different units and labels for identifying computer readable storage capacity.

Processing proceeds to operation S260, where priority value assignment module ("mod") 302 of FIG. 3A assigns relative priority values to each block of a set of blocks by applying a set of machine logic rules 304 to determine a relative priority rating of each block in the set of blocks. In this embodiment, there are five different relative priority ratings, integers 1 through 5 with 1 being the most important and 5 being the least important, that are available for assignment to each block of the set of blocks.

In this embodiment, set of machine logic rules 304 assigns a priority rating based on the following factors: (i) block size; (ii) recent read frequency of the individual block at the block level; (iii) recent read frequency of the file to which the block belongs; (iv) read frequency of a suite of files to which the file to which the block belongs; (v) total number of historical reads of the individual block at the block level; (vi) rate of change of read frequency (also called read trend); (vii) data protection level of the block; (viii) number of references of a deduped block; (ix) manual determination (for example, by a human system administrator) of priority levels of files, suites of files or blocks; (x) timing of various accesses to blocks (for example, accesses that occur during highly secure operations; (xi) encryption status of blocks; (xii) identity of those with access permissions to various blocks, files and/or suites of files; (xiii) identity of owners of various blocks, files and/or suites of files; (xiv) file type of file to which a block belongs; (xv) age of a block (that is, time since block was first created); and (xvi) file name of a file to which a block belongs.

As will be further explained in the following sub-section, Euclidean distance of a k-means clustering algorithm may be used in performing operation S260. The following sub-section will also discuss other techniques that can be used in assigning priority values, such as analysis of the attributes of the centroids and ranks the relative priority of each centroid.

Processing proceeds to operation S265, where failure condition mod 312 of FIG. 3A determines a drive failure condition for one disk drive of the set of raid disk drives 214 of FIG. 3B. Drive failure conditions can be either physical or logical. Physical drive failure conditions include mechanical failure of moving parts, such as motors which spin the disks and move a drive head, misalignment of the drive head or disks, and damage or degradation to the magnetic properties of the disks or drive head. Logical drive failure conditions include corruption of the file system from missing or improperly altered drive registries. Failure condition mod 312 detects one or more of these failure conditions by monitoring logs from each disk drive in the set of raid disk drives 214 of FIG. 1. In this example embodiment, failure condition mod 312 reads a physical error of a failed motor within the logs of disk drive A 352a of the set of raid disk drives 214 of FIG. 3B. As an alternative, failure condition mod 312 monitors the Self-Monitoring, Analysis and Reporting Technology (S.M.A.R.T.) monitoring system and detects a drive failure when a S.M.A.R.T. attribute is detected above a pre-defined threshold. As a further alternative, a failure condition is detected at a pre-defined date prior to an estimated failure date reported in a Threshold Exceeds Condition report from the S.M.A.R.T. monitoring system. As a further alternative, failure condition mod 312 initiates periodic self-testing in each disk drive of the set of raid disk drives and determines a drive failure condition based on the results of the self-test.

Most RAID failures occur on a drive by drive basis. As an alternative example to the example failure discussed in the previous paragraph, assume that disk drive B 352b experiences a power surge and fails suddenly and catastrophically. As shown in FIG. 3B, this drive has data from files F2, F3, F4, F5, F6, F7 and F8 in the portions of the three stripes 354, 356, 358 that were striped across it before the failure. In this example, if rebuilding the data, based on parity data of checksum data store 308, is completed before another disk drive fails, then all of the data of the disk drive B 352b can be rebuilt on a fresh, new disk drive (not shown) and the data of all of files F2, F3, F4, F5, F6, F7 and F8 can be fully recovered. However, as will be appreciated as method 250 progresses, the priority values of this embodiment are potentially important in the case that another drive fails while the data from disk drive B 352b is being rebuilt and before all of these files are fully recovered. More specifically, the priority values help determine a time order in which blocks, files and/or suites of files are rebuilt. In this way, if another drive does go "down" during rebuild, then it increases the likelihood that the relatively more important blocks/files/suites of files will be recovered before additional drive failures occur, and the lost data of disk drive 352b becomes unrecoverable by using: (i) data of the remaining functional drives; and (ii) parity data of checksum data store 308.

Processing proceeds to operation S270, where reconstruction mod 314 of FIG. 3A retrieves from priority values data store 310 the priority values for all of the files on failed disk drive A 352a of the set of RAID disk drives 214 of FIG. 3B. In this example embodiment, there are eight files stored in the memory of the three stripes (354a/b/c-358a/b/c) of the three disk drives (Disk Drive A 352a, Disk Drive B 352b and Disk Drive C 352c) of the set of RAID disk drives 214 of FIG. 3B. Each of the eight files have been assigned a priority value by priority value assignment mod 302 of FIG. 3A. The reconstruction mod, upon determination that the Drive A has a failure condition, examines checksum data store 308 of FIG. 3A to determine which files had data blocks written to stripes on the Drive A. In this example embodiment, the reconstruction mod determines from the checksum data store that the Drive A contained blocks from File 1 (F1), File 2 (F2) and File 4 (F4), and then retrieves priority values for File 1, File 2 & File 4 from priority values data store 310 of FIG. 3A, which in this example the priority values are respectively 2, 1 and 3.

Processing proceeds to operation S275, where ordering sub-mod 316 of reconstruction mod 314 of FIG. 3A rebuilds the data of the failed disk drive in order of data priority based on the priority values of the data on the failed disk drive. In this example embodiment, ordering sub-mob 316, upon detecting that File 2 has a higher relative priority value than any other file present on the failed Disk Drive A, using checksum data stored in the checksum data store 308, rebuilds onto a spare disk drive the blocks of File 2 present on the failed Disk Drive A first, which, in this example include blocks 1 through 4 on First Stripe 354a of the failed Disk Drive A. After ordering sub-mod 316 completes rebuilding the blocks of File 2 present on the failed Disk Drive A onto the spare disk drive, ordering sub-mod 316 then determines that of the two remaining files (File 1 and File 4), File 1 has a higher relative priority value than any other remaining file present on the failed Disk Drive A, and rebuilds blocks 1 and 2 from the First Stripe 354a and block 3 from Third Stripe 358a. Next, the ordering sub-mod, having only File 4 remaining, rebuilds all of the blocks of File 4 which were present on the failed Disk Drive A, which includes blocks 1 and 2 from the Third Stripe 358a (F4B1 and F4B2). As an alternative, other types of backup data can be used to restore the data of a failed disk drive, such as complete data backups, remotely or locally, or other sources of backup recovery data.

Processing proceeds to operation S280, where machine learning sub-mod 306 of priority value assignment mod 302 revises the machine logic for determining priority values. In this example embodiment, machine learning sub-mod 306 of priority value assignment mod 302 of control program 300 of FIG. 3A analyzes whether the priority values assigned by set of machine logic rules 304 to the eight files has room for improved accuracy. In the present example embodiment, machine learning sub-mod determines that additional weight should be granted to the value of the reads per minute category, as File 3 shared a priority value classification of 3 with File 4, which would have led to a sub-optimal result of File 3 having a lower priority value assigned to it than File 1, despite being read 600% more often than File 1. The machine learning sub-mod also creates a rule that files with a 0 value for data protection cannot share a priority value with files that have a 1 value for data protection. This further optimizes the assignment of priority values in the event of future disk drive failures.

III. Further Comments and/or Embodiments

Some embodiments of the present invention recognize the following facts, potential problems and/or potential areas for improvement with respect to the current state of the art: (i) when the copy back process does not manage to complete the drive copy before another failure occurs, and the RAID array runs out of spares, that the technology design will potentially cause loss of data and/or associated economic losses; (ii) with the data striped, even if the reconstruction process manages to rebuild 30% of a drive prior to a failure, there is no guarantee that copy will have rebuilt files, but, rather, only that there will be rebuilt pieces of files, while other pieces of the original files may still be missing; (iii) in addition, the copy back process may have copied the user data, but not the metadata describing how the various pieces of various files go together; and/or (iv) even if copy back process identifies every piece of a partial rebuild (for example, the 30% rebuild mentioned above), along with the metadata to put it together with, it could be random OS (operating system) batch files while critical data files are permanently lost through the partial rebuild.

Some embodiments of the present invention may include one, or more, of the following features, characteristics and/or advantages: (i) a method of utilizing machine learning, in conjunction with RAID array technology, so as to allow for weight values to be assigned to data stored in the RAID array during a rebuild; (ii) categorizing the data stored in the RAID array based upon respective priority values of the data across the array; (iii) during a rebuild, instructing the array specifically which data is more pertinent to both of the array and/or the user in general and ensure that data having a priority category corresponding to the pertinent data is copied earlier in the copying process (for example, copied first); (iv) in the event of further disk failures across the array, an increased likelihood of the most important data still being retained; (v) tracking of usage patterns the RAID array; and (vi) tracking of usage patterns will not only be dependent upon time of last read or write, but also dependent upon consistency of use (for example, data used only about once a year may be one consistency of use category).

Some embodiments of the present invention may include one, or more, of the following features, characteristics and/or advantages: (i) array metadata, as it pertains to the user data, will be tracked to allow for a direct association between the data types; (ii) consistently monitoring array health as it pertains to drive and current rebuilds in progress; (iii) establishing user data "value" on a numerically quantified weight system (for example, possible predetermined weights of 1 to 5, with 1 being the most valuable and 5 being the least valuable); (iv) recognition of data types will allow for the priority value to be assigned based, in whole or in part, upon the type data (for example, pictures are typically smaller and can hold significant value, so while consideration of their frequency of usage may only warrant a 3 priority value for their corresponding data as stored in the RAID array, this data will, in some embodiments, be bumped up to a 1 priority value); (v) data inventorying will consistently be taking place across the array with priority values adjusting appropriately; (vi) small data will be weighed against large data (for example, to help determine if it is of better for the interest of the user to quickly copy a thousand small files versus 3 large ones); (vii) in the event of a drive failure, rebuilding a spare of the data stored on the failing drive will occur, as the RAID is designed to do typically in currently conventional RAID systems; (viii) based upon the "value" system assignment, this rebuild will begin with writing only data flagged with a relatively high priority value (for example, only rebuilding data with a priority value of 1 at the beginning); (ix) transferring both the user data as well as the metadata of relatively high priority data at the beginning of the rebuild process to allow for usability of the data in the event of a failure before completion of the rebuild; and/or (x) the rebuild process will work through the values until the rebuild has completed and all data has been copied back to the spare and the array is healthy again.

An example of assignment of priority values will now be discussed. In this example: (i) an Algorithm is k-means (this is an algorithm for clustering that generates groups of elements based on a combination of their characteristics by assigning labels to each element which correspond to a cluster or group); (ii) Distance is Euclidean (another popular distance function is Manhattan), where different distance functions affect the way the clusters form as well as their size which can be an advantage for certain types of data patterns while it can be a disadvantage for other types; and (iii) Observation variables are $X_{(n)}=(x_{(1)}, x_{(2)}, x_{(3)}, x_{(4)}, x_{(5)})$, where $x_{(1)}$ is Block size, $x_{(2)}$ is Read frequency expressed in reads per time unit, $x_{(3)}$ is Read trend, with estimated time units until next read, $x_{(4)}$ is data protection inclusion, and $x_{(5)}$ is used for a deduped block, number of references. That is the number of references to a block in a deduplicate environment. In this example, a deduped block is used to eliminate duplicate information by storing a block only once and when attempting to store the same data pattern again, just increment a pointer to this original block by one. In this example, $x_{(1)}, x_{(2)}, x_{(3)}, x_{(4)}, x_{(5)}$ are numerical quantities that are combined under machine logic rules to determine the priority value $X_{(n)}$ for the data block (or set of data blocks) called n. There can be many more factors considered (and even combinations of the ones already mentioned). Some embodiments of the present invention take into account these factors (but the k-means algorithm is not limited to only these) to provide the machine learning algorithm with flexibility to adjust and alter how priority values are determined. Additionally, the filename is an important factor to prevent a file ending up in different clusters.

Some embodiments of the present invention may consider a larger list of factors that may be considered in assigning priority values including: (i) block size; (ii) recent read frequency of the individual block at the block level; (iii) recent read frequency of the file to which the block belongs; (iv) read frequency of a suite of files to which the file to which the block belongs; (v) total number of historical reads of the individual block at the block level; (vi) rate of change of read frequency (also called read trend); (vii) data protection level of the block; (viii) number of references of a deduped block; (ix) manual determination (for example, by a human system administrator) of priority levels of files, suites of files or blocks; (x) timing of various accesses to blocks (for example, accesses that occur during highly secure operations; (xi) encryption status of blocks; (xii) identity of those with access permissions to various blocks, files and/or suites of files; (xiii) identity of owners of various blocks, files and/or suites of files; (xiv) file type of file to which a block belongs; (xv) age of a block (that is, time since block was first created); and (xvi) file name of a file to which a block belongs.

Some embodiments rebuild a failed hard disk drive in a RAID array to a spare hard disk drive, such as illustrated in diagrams 400a through 400e in FIGS. 4A through 4E respectively. FIGS. 4A to 4E are diagrams showing a rebuild of a failed hard disk drive in a RAID array to a spare disk drive 400 at five sequential points in time (T0 in FIG. 4A to T4 in FIG. 4E). Diagrams 400a to 400e include: hard disk drive 0 (HDD0) 402a to 402e (with reference letters indicating different sequential points in time); hard disk drive 1 (HDD1) 404a to 404e; hard disk drive (HDD2) 406a to 406e; parity drive 408a to 408e; and spare drive 410a to 410e.

At T0, HDD0 402a, HDD1 404a and HDD2 406a each store clusters of blocks of data ranked 1 through 5 by relative weight value (alternatively referred to as relative priority level). In this example, clusters can be of different sizes. At T1, HDD1 404b fails and spare 410b is available to receive rebuilt data from HDD1 404b. At T2, a first ranked cluster from HDD1 404c is rebuilt on spare 410c. At T3, a second ranked cluster from HDD1 404d is rebuilt on spare 410d. At T4, remaining data clusters from HDD1 404e are rebuilt on spare 410e (with the individual steps of rebuilding the third through fifth ranked clusters not shown), completing the rebuild operation. A single cluster can include blocks that reside in different HDD's. Users can control this by selecting the type of RAID (sequential vs stripped) or by using other techniques. Certain embodiments of the present invention avoid assigning different fragments of a given file to different clusters by adding the filename to the set of factors to consider when forming the clusters.

In the embodiment of the present invention that generates screenshot 400a, five data clusters ranked 1 through 5 in order of their priority are fragmented across three hard disk drives (HDD0 402a, HDD1 404a, HDD2 406a), where clusters are stored in different configurations on each hard disk drive. In these embodiments, the position of a data cluster on a hard disk drive is irrelevant in the event of a drive failure because rebuilding prioritizes rebuilding important data before less important data, as illustrated in screenshot 400d of FIG. 4D. In these embodiments, data cluster 2 of HDD1 is the second data cluster rebuilt on the spare despite being located after data clusters 1, 5 and 4 on HDD1.

Some embodiments of the present invention are used in RAID array architecture technology, managing and prioritizing rebuild at the file level by utilizing machine learning in conjunction with RAID arrays to allow for a priority value to be assigned during a rebuild (to a cluster of blocks) by categorizing based upon an assigned value of the data across the array. In these embodiments, during the rebuild, the priority values are used to determine which data is more pertinent to both the RAID array and/or to a user to ensure that data corresponding to higher priority value(s) are copied first before data corresponding to relatively lower priority values.

Some embodiments of the present invention may include one, or more, of the following features, characteristics and/or advantages: (i) creates a classification to help and prioritize the rebuild process of a damaged RAID array; (ii) grouping block(s) of data (for example, block(s) corresponding to a single file) for priority assignment purposes, rather than assigning priority values on a volume by volume basis; (iii) there can be data of different priority values in the same volume (but the present invention allows higher priority portions of the volume to be copied before lower priority portions); (iv) assigning priority values to blocks (or sets of blocks) using clustering algorithms which adapt themselves to the different types of data that can potentially be present; (v) analyzing the data blocks and creating groups (clusters) based on different features being monitored constantly; (vi) using those labels (groups) to cause the most important data to be rebuilt first to prevent a potential subsequent failure which would damage the RAID array beyond repair; (vii) dynamically using the read/write activity of the data itself, as well as how often the data is accessed and then automatically classifies the data to rebuild the critical data first; (viii) a more complex algorithm of determining how to prioritize the rebuilds; (ix) using write activity and/or frequency of access to determine the criticality of the data for purposes of assigning priority values to sets of block(s); (x) categorizing the data using an adaptable algorithm to classify and prioritize the data based on historical use; (xi) rebuilding most relatively high priority data first, in an effort to preserve it in the case of a subsequent failure; (xii) focuses on what to rebuild first versus anything a host is doing; and/or (xiii) taking an already failed drive and determining what to rebuild in what order.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of

What is claimed is:

1. A computer-implemented method comprising:
storing a plurality of blocks of data in a striped redundant array of independent devices (RAID) storage system that includes a plurality of storage devices;
storing parity data for the plurality of blocks of data;
updating, by machine logic, a priority assignment algorithm for assigning the priority data values based, at least in part, on a review of relative weights assigned to a set of factors considered when assigning priority data values and what priority data values were assigned to each block of data of the plurality of blocks of data;
for each given block of data of the plurality of blocks of data, assigning a priority data value to the given block of data based on the priority assignment algorithm; and
responsive to a failure of a first storage device of the plurality of storage devices, rebuilding, using the parity data and data of the blocks of data stored on the plurality of storage devices other than the first storage device, blocks of data that were stored on the first storage device in an order determined by priority values of the blocks of data that were stored on the first storage device.

2. The method of claim 1 wherein the assigning a priority data value is based, at least in part, upon at least one of the following: block size, read frequency, read trend, data protection inclusion, and number of references to a deduped block.

3. The method of claim 1 wherein the assigning a priority data value includes clustering each block of data of the plurality of blocks of data with a k-means clustering algorithm.

4. The method of claim 1 wherein the rebuilding rebuilds the blocks of data onto a second storage device.

5. The method of claim 4 further comprising:
remapping the parity data associated with the data blocks of the first storage device to the data blocks of the second storage device.

6. The method of claim 1 wherein the assigning a priority data value for the given block also assigns an identical priority value to blocks of data containing metadata associated with the given block.

7. A computer program product comprising:
a non-transitory computer readable storage medium; and
computer code stored on the non-transitory computer readable storage medium, with the computer code including instructions for causing a processor(s) set to perform operations including the following:
storing a plurality of blocks of data in a striped redundant array of independent devices (RAID) storage system that includes a plurality of storage devices,
storing parity data for the plurality of blocks of data,
updating, by machine logic, a priority assignment algorithm for assigning the priority data values based, at least in part, on a review of relative weights assigned to a set of factors considered when assigning priority data values and what priority data values were assigned to each block of data of the plurality of blocks of data,
for each given block of data of the plurality of blocks of data, assigning a priority data value to the given block of data based on the priority assignment algorithm, and
responsive to a failure of a first storage device of the plurality of storage devices, rebuilding, using the parity data and data of the blocks of data stored on the plurality of storage devices other than the first storage device, blocks of data that were stored on the first storage device in an order determined by priority values of the blocks of data that were stored on the first storage device.

8. The product of claim 7 wherein the assigning a priority data value is based, at least in part, upon at least one of the following: block size, read frequency, read trend, data protection inclusion, and number of references to a deduped block.

9. The product of claim 7 wherein the assigning a priority data value includes clustering each block of data of the plurality of blocks of data with a k-means clustering algorithm.

10. The product of claim 7 wherein the rebuilding rebuilds the blocks of data onto a second storage device.

11. The product of claim 10 wherein the computer code further includes instructions for causing the processor(s) set to perform the following operation:
remapping the parity data associated with the data blocks of the first storage device to the data blocks of the second storage device.

12. The product of claim 7 wherein the assigning a priority data value for the given block also assigns an identical priority value to blocks of data containing metadata associated with the given block.

13. A computer system comprising:
a processor(s) set;
a machine readable storage device; and
computer code stored on the machine readable storage device, with the computer code including instructions for causing the processor(s) set to perform operations including the following:
storing a plurality of blocks of data in a striped redundant array of independent devices (RAID) storage system that includes a plurality of storage devices,
storing parity data for the plurality of blocks of data,
updating, by machine logic, a priority assignment algorithm for assigning the priority data values based, at least in part, on a review of relative weights assigned to a set of factors considered when assigning priority data values and what priority data values were assigned to each block of data of the plurality of blocks of data,
for each given block of data of the plurality of blocks of data, assigning a priority data value to the given block of data based on the priority assignment algorithm, and
responsive to a failure of a first storage device of the plurality of storage devices, rebuilding, using the parity data and data of the blocks of data stored on the plurality of storage devices other than the first storage device, blocks of data that were stored on the first storage device in an order determined by priority values of the blocks of data that were stored on the first storage device.

14. The system of claim 13 wherein the assigning a priority data value is based, at least in part, upon at least one of the following: block size, read frequency, read trend, data protection inclusion, and number of references to a deduped block.

15. The system of claim 13 wherein the assigning a priority data value includes clustering each block of data of the plurality of blocks of data with a k-means clustering algorithm.

16. The system of claim 13 wherein the rebuilding rebuilds the blocks of data onto a second storage device.

17. The system of claim 13 wherein the assigning a priority data value for the given block also assigns an identical priority value to blocks of data containing metadata associated with the given block.

\* \* \* \* \*